(12) United States Patent
Chu et al.

(10) Patent No.: US 10,982,646 B2
(45) Date of Patent: Apr. 20, 2021

(54) OCEAN TIDAL CURRENT ENERGY POWER GENERATING SYSTEM

(71) Applicant: GUODIAN UNITED POWER TECHNOLOGY COMPANY LTD., Beijing (CN)

(72) Inventors: Jingchun Chu, Beijing (CN); Ling Yuan, Beijing (CN); Fayong Jia, Beijing (CN); Lei Pan, Beijing (CN); Ting Wang, Beijing (CN)

(73) Assignee: GUODIAN UNITED POWER TECHNOLOGY COMPANY LTD., Beijing (CN)

( * ) Notice: Subject to any disclaimer, the term of this patent is extended or adjusted under 35 U.S.C. 154(b) by 33 days.

(21) Appl. No.: 16/609,740

(22) PCT Filed: Jun. 29, 2018

(86) PCT No.: PCT/CN2018/093795
§ 371 (c)(1),
(2) Date: Oct. 31, 2019

(87) PCT Pub. No.: WO2019/011134
PCT Pub. Date: Jan. 17, 2019

(65) Prior Publication Data
US 2020/0072183 A1    Mar. 5, 2020

(30) Foreign Application Priority Data

Jul. 14, 2017    (CN) .......................... 201710576212.8

(51) Int. Cl.
*F03B 13/26* (2006.01)
*F03B 3/06* (2006.01)
(Continued)

(52) U.S. Cl.
CPC .............. *F03B 13/264* (2013.01); *F03B 3/06* (2013.01); *F03B 13/26* (2013.01); *F03B 15/00* (2013.01);
(Continued)

(58) Field of Classification Search
CPC ...... F03B 13/26; F03B 13/264; F03B 17/061; F03B 3/06; F03B 3/14; F03B 11/006;
(Continued)

(56) References Cited

U.S. PATENT DOCUMENTS 6,652,221 B1 * 11/2003 Praenkel ............... F03B 17/061
                                                                                      415/3.1
2006/0244267 A1 * 11/2006 Fraenkel ............... F03B 17/061
                                                                                       290/54
(Continued)

FOREIGN PATENT DOCUMENTS

CN      102562427 A     7/2012
CN      103397980 A    11/2013
(Continued)

*Primary Examiner* — Mark A Laurenzi
*Assistant Examiner* — Xiaoting Hu
(74) *Attorney, Agent, or Firm* — Bayramoglu Law Offices LLC (57) ABSTRACT

An ocean tidal current energy power generating system, including a fixing mechanism, an ocean tidal current energy power generator set and a signal monitoring mechanism. The fixing mechanism includes floating bodies, fixing rods, horizontal supporting rods, and a working platform; the floating bodies are fixed to seabed by means of anchor chains; the fixing rods are fixed to the floating bodies; the horizontal supporting rods and the working platform are respectively fixed to underwater portions of the fixing rods and overwater portions of the fixing rods. The power generator set includes underwater assemblies and an overwater assembly. Each underwater assembly includes blades, a hub, a main shaft, a gear box, a coupling, a power generator, a (Continued)

stern cabin and a yawing mechanism, successively connected to each other; a variable pitch mechanism is disposed in the hub.

20 Claims, 3 Drawing Sheets

(51) Int. Cl.
*F03B 15/00* (2006.01)
*B63B 35/44* (2006.01)
*F03B 11/00* (2006.01)

(52) U.S. Cl.
CPC ..... *B63B 2035/4466* (2013.01); *F03B 11/008* (2013.01); *F05B 2270/328* (2013.01); *F05B 2270/329* (2013.01); *Y02E 10/20* (2013.01); *Y02E 10/30* (2013.01)

(58) Field of Classification Search
CPC .......... F03B 11/008; F03B 15/00; E02B 9/08; F03D 9/008; B63B 2035/4466; F05B 2270/328; F05B 2270/329
See application file for complete search history.

(56) References Cited

U.S. PATENT DOCUMENTS

| | | | |
|---|---|---|---|
| 2006/0269362 A1* | 11/2006 | Henriksen | F03B 13/264 405/224 |
| 2009/0121487 A1* | 5/2009 | Fraenkel | F03B 13/142 290/53 |
| 2010/0183377 A1* | 7/2010 | Fraenkel | E02D 27/52 405/232 |
| 2016/0245258 A1 | 8/2016 | Firkser et al. | |
| 2017/0342957 A1* | 11/2017 | Baldock | F03B 17/061 |
| 2018/0009512 A1* | 1/2018 | Dunne | F03B 13/264 |

FOREIGN PATENT DOCUMENTS

| | | | |
|---|---|---|---|
| CN | 203515944 U | * | 4/2014 |
| CN | 203756423 U | | 8/2014 |
| CN | 104454325 A | | 3/2015 |
| CN | 104481790 A | | 4/2015 |
| CN | 204553079 U | | 8/2015 |
| CN | 107165774 A | | 9/2017 |
| CN | 207111294 U | | 3/2018 |

* cited by examiner

OCEAN TIDAL CURRENT ENERGY POWER GENERATING SYSTEM

CROSS REFERENCE TO THE RELATED APPLICATIONS

This application is the national phase entry of International Application No. PCT/CN2018/093795, filed on Jun. 29, 2018, which is based upon and claims priority of Chinese Patent Application No. 201710576212.8, entitled "ocean tidal current energy power generating system", filed to the China National Intellectual Property Administration on Jul. 14, 2017, the entire contents of which are incorporated herein by reference.

TECHNICAL FIELD

The present disclosure relates to the technical field of ocean energy power generation and more specifically, relates to a floating type semi-direct-drive ocean tidal current energy power generating system.

BACKGROUND

Ocean tidal current energy is the kinetic energy contained in tidal water during horizontal movement. A relatively stable speed flow can be formed caused by thermal radiation, evaporation, precipitation and cold contraction in the ocean, in addition to wind, Coriolis force and tide force. Ocean tidal current power generating system utilizes the kinetic energy of the ocean current during the horizontal movement to generate and supply electric energy through energy capture, energy conversion and energy transmission.

China has abundant ocean tidal current energy resources. The research and development of efficient and reliable ocean tidal current energy power generating systems will greatly promote the implementation of a renewable energy development strategy in China. At present, ocean tidal current power generating systems are still in the research stage. There are still many aspects including technical and overall design of the power generating system in the need of a breakthrough.

The existing ocean tidal current power generating system still has many defects and needs to be further improved. How to create and design a novel floating type semi-direct-drive ocean tidal current energy power generating system is currently one of the most important research and development topics.

SUMMARY

The technical problem to be solved by the present disclosure is to provide an ocean tidal current energy power generating system, so as to generate electricity by using ocean tidal current energy simply, efficiently, reliably, and safely, thereby overcoming the shortcomings of the existing ocean tidal current power generating system.

To solve the above technical problem, the present disclosure provides an ocean tidal current energy power generating system, including a fixing mechanism, an ocean tidal current energy power generator set and a signal monitoring mechanism.

The fixing mechanism includes floating bodies, fixing rods, horizontal supporting rods, and a working platform. The floating bodies float on sea surface and lower parts of the floating bodies are fixed to seabed by means of anchor chains. The fixing rods are fixed to the floating bodies. The horizontal supporting rods are vertically fixed to underwater portions of the fixing rods and the working platform is vertically fixed to overwater portions of the fixing rods.

The ocean tidal current energy power generator set includes underwater assemblies and an overwater assembly. Each underwater assembly includes blades, a hub, a main shaft, a gear box, a coupling, a power generator, a stern cabin and a yawing mechanism, and the blades, the hub, the main shaft, the gear box, the coupling, the power generator, the stern cabin and the yawing mechanism are successively connected to one another. A variable pitch mechanism is disposed in the hub. The yawing mechanism is disposed between the coupling and the horizontal supporting rod and configured to drive the underwater assemblies to a yaw relatively to the horizontal supporting rod. The underwater assemblies are directly immersed in the seawater.

The overwater assembly includes a converter, connected to the power generator by a submarine cable and a control cabinet connected to the yawing mechanism, a variable pitch mechanism, a gear box, a coupling, a power generator and the stern cabin by submarine cables. The converter and the control cabinet are both disposed on the working platform.

The signal monitoring mechanism includes a current meter connected to the control cabinet. The current meter is disposed on the horizontal supporting rod and configured to monitor the current direction of ocean current in real time.

Further, the fixing mechanism is a supporting system for the tidal current energy set. The ocean tidal current energy power generator set is an ocean tidal current energy turbine. The signal monitoring mechanism is a signal monitoring system. The floating body is a floating structure. The horizontal supporting rod is a horizontal supporting structure. The fixing rod is a fixing structure and the stern cabin is a wiring cabin.

Further, the ocean tidal current energy power generating system also includes a lifting mechanism. The lifting mechanism includes a lifting device and a lifting control system. The lifting device is disposed on the fixing structure and a lower part of the lifting device is fixedly connected to the horizontal supporting structure. The lifting control system is disposed on the working platform and configured to control the lifting device to move up and down along the fixing structure, thereby driving a lifting motion of the underwater assemblies of the ocean tidal current energy turbine.

Further, the lifting device includes gears and racks. The racks are fixedly connected on the fixing structure. The gears are fixedly connected to the horizontal supporting structure and the gears are engaged with the racks.

Further, the ocean tidal current energy power generating system includes two underwater assemblies of the ocean tidal current energy turbine. The two underwater assemblies are symmetrically arranged at both ends of the horizontal supporting structure and the two underwater assemblies are connected to the overwater assembly.

Further, the variable pitch mechanism includes a variable pitch bearing and a variable pitch reducer, which are connected to each other. The variable pitch bearing is fixedly connected to the blades. The control cabinet is connected to the variable pitch reducer, configured to send out a control command to the variable pitch reducer to drive the variable pitch bearing to drive the blades.

Further, the variable pitch mechanism is configured to make the blades rotating with a pitch angle from 0 to 270 degrees. A pitch angle is from 0 to 90 degrees with the positive current direction and a pitch angle is from 180 to 270 degrees with the reverse current direction.

Further, the yawing mechanism includes a yawing bearing and a yawing reducer, which are connected to each other. The yawing bearing is fixedly connected to the underwater assemblies. The control cabinet is connected to the yawing reducer, configured to send out a control command to the yawing reducer to drive the yawing bearing to drive the underwater assemblies rotating.

Further, the ocean tidal current energy power generating system also includes an underwater sealing system. The underwater sealing system includes a first rotary seal disposed between an inner ring and an outer ring of the variable pitch bearing.

Further, the yawing mechanism is configured to make the ocean tidal current energy turbine rotating by 180 degrees to maintain a horizontal axis of the ocean tidal current energy turbine parallel to an ocean current direction at all times, thus making the blades and the hub always facing a direction of the incoming flow.

Further, an isolation flange is disposed between each of the blades and the hub.

Further, the ocean tidal current energy power generating system includes an underwater sealing system. The underwater sealing system includes a second rotary seal disposed between the main shaft and the gear box, a first static seal disposed between the gear box and the coupling, a second static seal disposed between the coupling and the power generator, and a third static seal disposed between the power generator and the wiring cabin.

Further, the signal monitoring system also includes a variable pitch sensing assembly, a gear box sensing assembly, a power generator sensing assembly and a wiring cabin sensing assembly, all of which are connected to the control cabinet. The variable pitch sensing assembly is disposed in the hub. The gear box sensing assembly is disposed in the gear box. The power generator sensing assembly is disposed in the power generator and the wiring cabin sensing assembly is disposed in the wiring cabin.

Further, the variable pitch sensing assembly includes a variable pitch speed sensor and a variable pitch angle sensor. The variable pitch speed sensor and the variable pitch angle sensor are both disposed in the hub.

Further, the gear box sensing assembly includes an oil level sensor, an oil pressure sensor, an oil temperature sensor and a vibration sensor. The oil level sensor is configured to detect oil level in the gear box. The oil pressure sensor is configured to detect oil pressure in the gear box. The oil temperature sensor is configured to detect oil temperature in the gear box. The vibration sensor is configured to detect vibration of transmission components in the gear box.

Further, the power generator sensing assembly includes a voltage and current sensor configured to detect voltage and current of the power generator and a first temperature sensor configured to detect temperature of the power generator.

Further, an axial center of the underwater assembly is provided with a hollow shaft. The hollow shaft is configured as a cable going through the control cabinet to be connected to the variable pitch mechanism.

Further, the wiring cabin is also provided with submarine cable protection pipes configured to protect the submarine cables. Tops of the submarine cable protection pipes are raised above a sea level.

Further, the blades are made of carbon fiber, glass fiber or a combination of carbon fiber and glass fiber. Blade roots are pre-embedded bolts.

Further, a video monitoring module is disposed inside the ocean tidal current energy turbine Further, the supporting system for the tidal current energy turbine and the ocean tidal current energy turbine are configured such that surfaces in contact with seawater are all provided with protective coatings.

Further, the gear box adopts a two-stage transmission structure or a three-stage transmission structure.

Further, the power generator adopts a permanent magnet synchronous generator.

Further, the blades are two-bladed or three-bladed or more than three-bladed.

With such a design, the present disclosure has at least the following advantages.

The present disclosure adopts a floating type ocean tidal current energy power generating system having a semi-direct-drive type turbine. By dividing the ocean tidal current energy turbine into underwater assemblies and an overwater assembly, generating electricity by using ocean tidal current energy safely and reliably is realized. By setting the current meter, the direction of ocean tidal current can be monitored in real time, and a yawing direction and a variable pitch direction are adjusted in real time according to the ocean tidal current direction, so as to ensure a highly efficient conversion of ocean tidal current energy into electric energy and to reduce the loss of power connected to the grid.

Further, the present disclosure is capable of ensuring the reliability of the operation of the turbine by setting an underwater rotary seal and a static seal structure, as well as a variable pitch sensing assembly, a gear box sensing assembly, a power generator sensing assembly and a wiring cabin sensing assembly.

Further, the present disclosure improves the safety and convenience of the operation and maintenance of the turbine with a lift mechanism.

Further, the present disclosure can effectively prevent seawater from entering the turbine by setting submarine cables in the wiring cabin and having the tops of the submarine cables being raised above sea level, thereby protecting the submarine cables from damage and acting as a breathing pipe of the gear box to ensure the balance of temperature and pressure in the gear box. When the water depth is large, adopting an underwater plug connector or a seal connection of submarine cable passing through cabin can not only play a sealing role, but also reduces the force applied on the submarine cable protection pipes and the influence of ocean current fluctuation.

Further, the present disclosure can realize an energy capture of a bi-directional ocean current through a 180-degree yawing mechanism and a 270-degree variable pitch mechanism and a power generation efficiency can be doubled.

Further, the present disclosure is provided with an isolation flange between the blade and the hub to prevent seawater from penetrating into the hub and the power generator set through the blades, thus ensuring safe operation of the turbine.

The present disclosure realizes the comprehensiveness, reliability and advancement in overall design and technology for the ocean tidal current energy turbine.

BRIEF DESCRIPTION OF THE DRAWINGS

The above is only an overview of the technical solutions of the present disclosure. The present disclosure will be further described in detail below in conjunction with the drawings and specific implementation method in order to explain the technical means of the present disclosure more clearly.

DETAILED DESCRIPTION OF THE EMBODIMENTS

Figure 1:
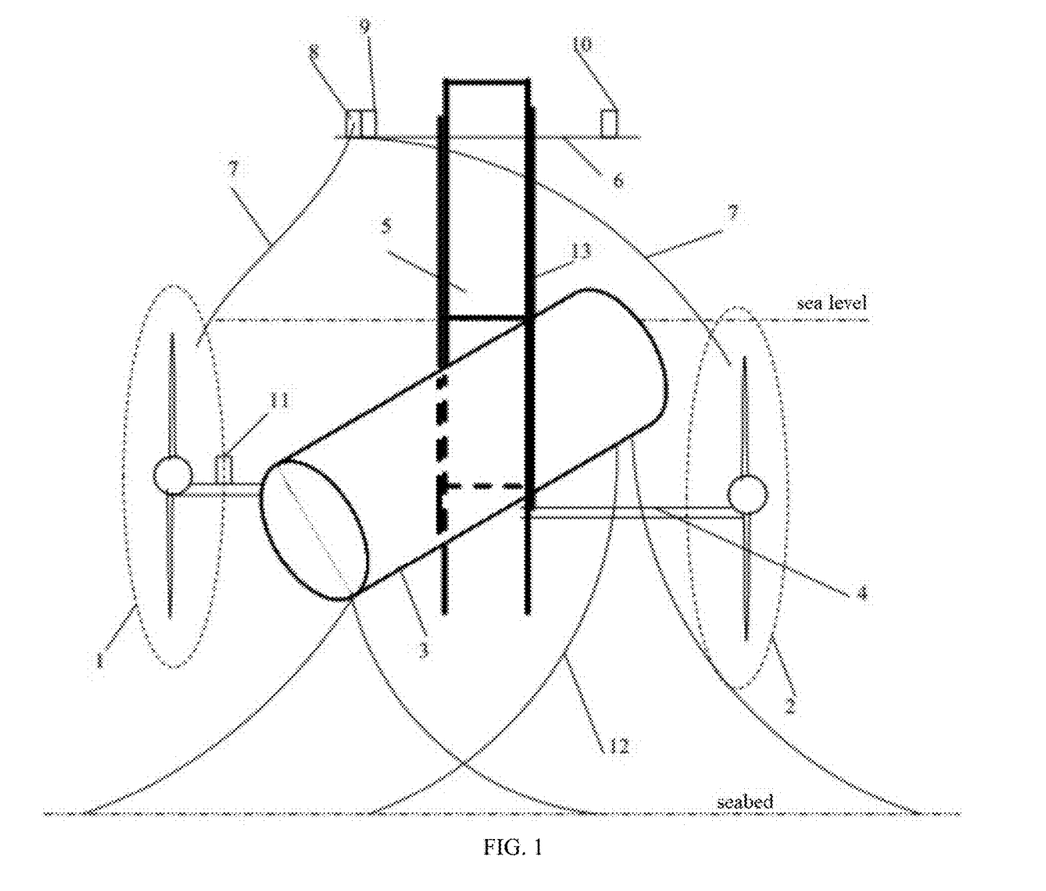
FIG. 1 is a schematic view showing an overall structure of an ocean tidal current energy power generating system according to the present disclosure.
Figure 2:
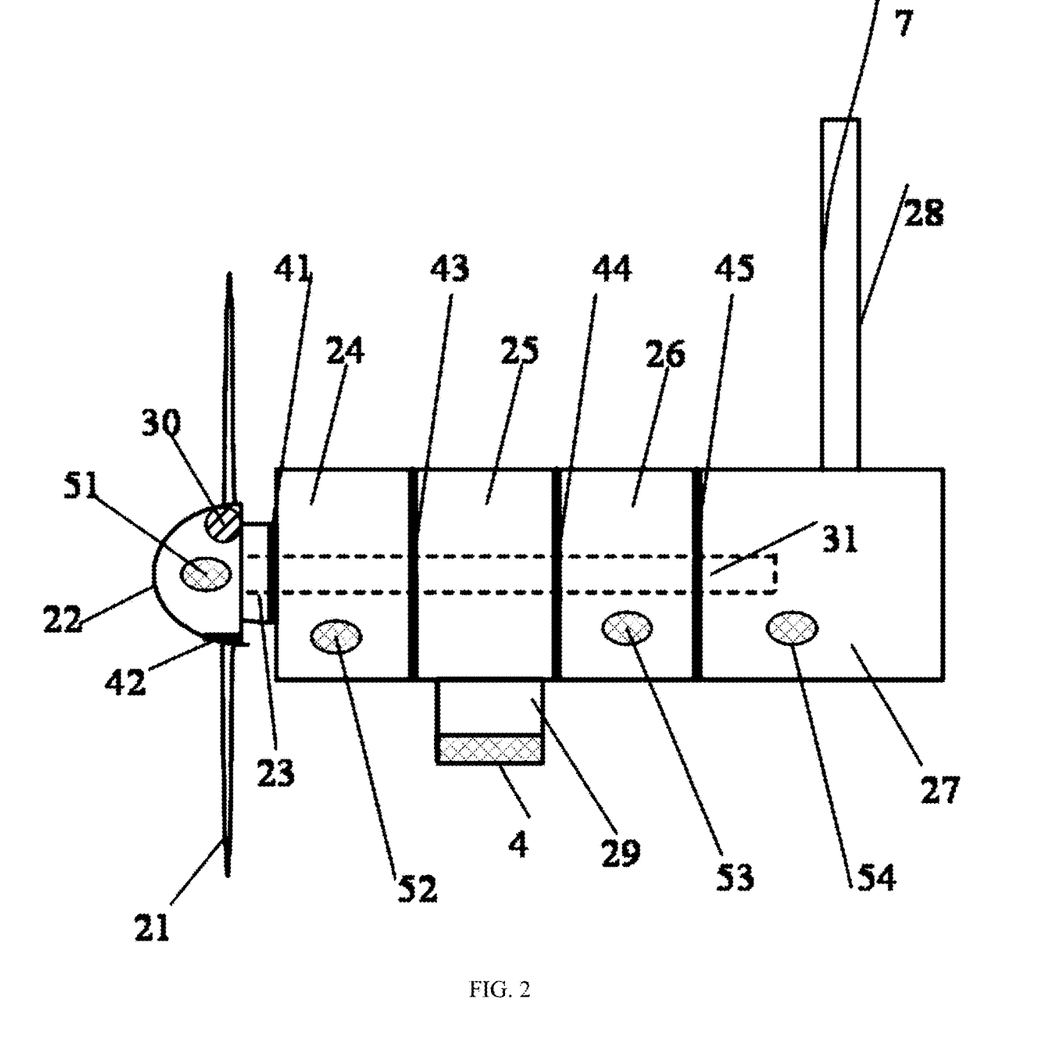
FIG. 2 is a schematic view showing a structure of a semi-direct-drive type turbine in an ocean tidal current energy power generating system according to an embodiment of the present disclosure.

As shown in FIG. 1 and FIG. 2, an ocean tidal current energy power generating system of the present embodiment includes a tidal current turbine supporting system, a lifting mechanism, an ocean tidal current energy turbine, a signal monitoring system and an underwater sealing system.

The tidal current turbine supporting system includes the floating body structure 3, the fixing structure 5, the horizontal supporting structure 4 and the working platform 6. The number of the floating body structures 3 may be one or more. In the present embodiment, one floating body structure 3 is adopted. The floating body structure 3 floats on sea surface and a lower part of the floating body structure 3 is firmly fixed to seabed by means of the anchor chain 12 and which is configured to support the ocean tidal current energy power generating system to ensure the safety of the system. The fixing structure 5 is fixed to the floating body structure 3. The horizontal supporting structure 4 is vertically fixed to an underwater portion of the fixing structure 5 and the working platform 6 is vertically fixed to an overwater portion of the fixing structure 5. It should be understood that the above "vertically" may be completely vertical, or roughly vertical.

The ocean tidal current energy turbine includes underwater assemblies and an overwater assembly. Each of the underwater assemblies includes the blades 21, the hub 22, the main shaft 23, the gear box 24, the coupling 25, the power generator 26, the wiring cabin 27 and the yawing mechanism 29, and the blades 21, the hub 22, the main shaft 23, the gear box 24, the coupling 25, the power generator 26, the wiring cabin 27 and the yawing mechanism 29 are successively connected to one another. The variable pitch mechanism 30 is disposed in the hub 22. The yawing mechanism 29 is disposed between the coupling 25 and the horizontal supporting structure 4, configured to drive the underwater assemblies to a yaw by 180 degrees relative to the horizontal supporting structure 4. In other embodiments of the present disclosure, the yawing mechanism 29 may be disposed between the gear box 24 and the horizontal supporting structure 4.

Figure 3:
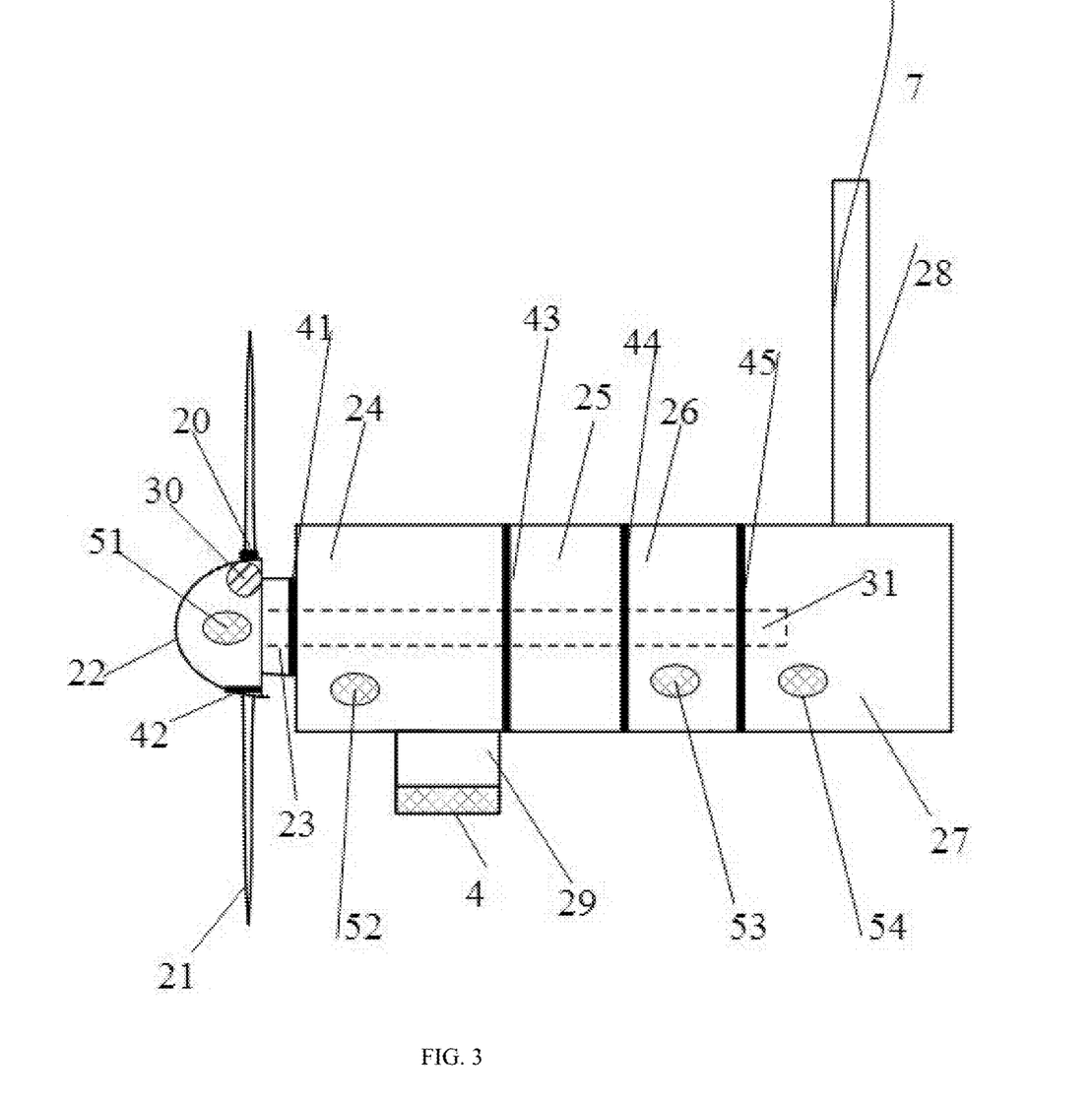
FIG. 3 is a schematic view showing a structure of a semi-direct-drive type turbine in an ocean tidal current energy power generating system according to another embodiment of the present disclosure.

Referring to FIG. 3, in another embodiment of the present disclosure, each of the underwater assemblies includes the blades 21, the isolation flange 20, the hub 22, the main shaft 23, the gear box 24, the coupling 25, the power generator 26, the wiring cabin 27 and the yawing mechanism 29, and the blades 21, the hub 22, the main shaft 23, the gear box 24, the coupling 25, the power generator 26, the wiring cabin 27 and the yawing mechanism 29 are successively connected to one another. Optionally, the isolation flange 20 is disposed between each of the blades 21 and the hub 22 to prevent seawater from penetrating into the hub 22 and the ocean tidal current energy turbine through the blades 21 and to ensure a safe operation of the ocean tidal current energy power generator set.

In the present embodiment, the blades 21 are two-bladed. A three-bladed structure or a multi-bladed structure having more than three blades can be adopted. The gear box 24 adopts a two-stage transmission structure or a three-stage transmission structure. The power generator 26 adopts a permanent magnet synchronous generator.

The overwater assembly includes the converter 8 connected to the power generator by the submarine cable 7 and the control cabinet 9 connected to the yawing mechanism 29, the variable pitch mechanism 30, the gear box 24, the coupling 25, the power generator 26 and the wiring cabin 27 by the submarine cables 7. The converter 8 and the control cabinet 9 are both disposed on the working platform 6. Therefore, an operation is convenient. Meanwhile, safety of the power generating system is improved because placing a large number of electrical components under water will cause serious consequences if a leakage occurs.

In the present embodiment, the ocean tidal current energy power generating system includes two underwater assemblies of the ocean tidal current energy turbine, such as the first underwater assembly 1 and the second underwater assembly 2. The two underwater assemblies are symmetrically arranged at both ends of the horizontal supporting structure 4 and the two underwater assemblies are connected to the overwater assembly. In this way, a force balance of the horizontal supporting structure 4 can be maintained and an interference of the fixing structure 5 on an ocean current can be avoided, thus influencing the power generation efficiency of the turbine and improving the capture efficiency of ocean current.

The lifting mechanism includes the lifting device 13 and the lifting control system 10. The lifting device 13 is disposed on the fixing structure 5. In other embodiments, the lifting device 13 can be fixed around the fixing structure 5. A lower part of the lifting device 13 is fixedly connected to the horizontal supporting structure 4 and an upper part of the lifting device 13 is movably connected to the working platform 6. The lifting control system 10 is disposed on the working platform 6 and configured to control the lifting device 13 to move up and down along the fixing structure 5. In this way, the underwater assemblies of the ocean tidal current turbine are put into seawater to generate electricity when in a normal state, and are lifted above the sea level for repairing when needed. This facilitates the operation and maintenance of the system and improves safety.

The lifting device 13 includes gears and racks. The racks are fixedly connected to the fixing structure 5. The gears are fixedly connected to the horizontal supporting structure 4. The gears are engaged with the racks. By up and down movements of the gears along the racks, the horizontal supporting structure 4 and the underwater assemblies are driven to move up and down along the fixing structure 5.

The signal monitoring system includes the current meter 11 connected to the control cabinet 9. The current meter 11 is disposed on the horizontal supporting structure 4 and is configured to monitor ocean current direction and speed change in real time. When tide direction changes in flood and ebb, a signal monitored by the current meter 11 is transmitted to the control cabinet 9 through the cable 7. The control cabinet 9 send outs a control command to the yawing mechanism 29 and the yawing mechanism 29 drives the turbine to rotate according to a tidal current direction. A flow speed signal and a flow direction signal are monitored by the current meter 11, based on which the control cabinet 9 send outs a control command to the variable pitch mechanism 30 through the submarine cable 7, and the central shaft 27. The variable pitch mechanism 30 drive the blades 21 to be adjusted in a pitch angle within 90 degrees. If the yawing mechanism 29 fails, the variable pitch mechanism 30 can perform a 270-degree pitch change to capture energy of a bi-directional ocean tidal current.

The variable pitch mechanism 29 includes a variable pitch bearing and a variable pitch reducer, which are connected to each other. The variable pitch bearing is fixedly connected to the blades 21. The control cabinet 9 is connected to the variable pitch reducer and is configured to send out a control command to the variable pitch reducer to drive the variable pitch bearing to drive the blades, thus realizing the change of the pitch angle of the blades 21.

The variable pitch mechanism 29 is configured to make the angle of blades 21 change from 0 to 270 degrees. A positive ocean current pitch angle is 0 to 90 degrees. Optionally, a first optimal pitch angle is 0 degree and a first safe feathering position is 90 degrees. A reverse ocean current pitch angle is 180 to 270 degrees. Optionally, a second optimal pitch angle is 180 degrees and a second safe feathering position is 270 degrees. Optionally, each blade 21 can be provided with a separate set of the variable pitch mechanism 29.

The yawing mechanism 30 includes a yawing bearing and a yawing reducer, which are connected to each other. The yawing bearing is fixedly connected to the underwater assemblies. The control cabinet 9 is connected to the yawing reducer and is configured to send out a control command to the yawing reducer to drive the yawing bearing to drive the underwater assemblies rotating, thus realizing a change of a rotation angle of the underwater assemblies.

The yawing mechanism 30 is configured to make the ocean tidal current energy turbine rotating by 180 degrees in order to maintain a horizontal axis of the ocean tidal current energy turbine parallel to an ocean current direction at all times, thus making the blades 21 and the hub 22 always facing the direction of an incoming flow.

The energy capture of the bi-directional ocean current is achieved by the variable pitch mechanism 29 and the yawing mechanism 30. The variable pitch mechanism 29 and the yawing mechanism 30 can be used simultaneously or separately.

In the present embodiment, an axial center of the underwater assembly is provided with the hollow shaft 31. The hollow shaft 31 is configured as the cable 7 going through the control cabinet 9 to be connected to the variable pitch mechanism, establishing a communication connection between the control cabinet 9 and the variable pitch mechanism 29. The wiring cabin 27 is also provided with submarine cable protection pipes 28 for protecting the submarine cables 7. Tops of the submarine cable protection pipes 28 are raised above sea level, thereby preventing seawater from entering the turbine and protecting the submarine cables 7 from damage and acting as a breathing pipe of the gear box 24 to ensure a balance of temperature and pressure in the gear box.

In the present embodiment, the ocean tidal current energy power generating system also includes an underwater sealing system. The underwater sealing system includes the first rotary seal 42 disposed between an inner ring and an outer ring of the variable pitch bearing, the second rotary seal 41 disposed between the main shaft 23 and the gear box 24, the first static seal 43 disposed between the gear box 24 and the coupling 25, the second static seal 44 disposed between the coupling 25 and the power generator 26, and the third static seal 45 disposed between the power generator 26 and the wiring cabin 27. The rotary seal guarantees a normal rotary movement between the rotating components without leakage and the static seal guarantees no seawater can leak between the connecting components.

In addition, static seals can be disposed between contact surfaces of other connecting components of the tidal current energy turbine.

In order to further improve the operation and maintenance security of the power generating system, the signal monitoring system also includes the variable pitch sensing assembly 51, the gear box sensing assembly 52, the power generator sensing assembly 53 and the wiring cabin sensing assembly 54, all of which are connected to the control cabinet 9. The variable pitch sensing assembly 51 is disposed in the hub 22, including a variable pitch speed sensor and a variable pitch angle sensor. The variable pitch speed sensor and the variable pitch angle sensor are both disposed in hub 22. The gear box sensing assembly 52 is disposed in the gear box 24, including an oil level sensor, an oil pressure sensor, an oil temperature sensor and a vibration sensor. The oil level sensor is configured to detect oil level in the gear box 24. The oil pressure sensor is configured to detect oil pressure in the gear box 24. The oil temperature sensor is configured to detect an oil temperature in the gear box 24. The vibration sensor is configured to detect vibration of transmission components in the gear box 24. The power generator sensing assembly 53 is disposed in the power generator 26, including a voltage and a current sensor configured to detect voltage and current of the power generator 26 and a first temperature sensor configured to detect temperature of the power generator 26. The wiring cabin sensing assembly 54 is disposed in the wiring cabin 27, including a second temperature sensor configured to detect temperature in the wiring cabin 27 and a humidity sensor configured to detect humidity in the wiring cabin 27. In addition, each of the above sensing assemblies is further provided with a liquid level alarm. In case of seawater leakage, the variable pitch sensing assembly 51, the gear box sensing assembly 52, the power generator sensing assembly 53 and the wiring cabin sensing assembly 54 will send alarm signals to the control cabinet 9. When necessary, the lifting control system 10 is started and the turbine is lifted above the sea level by the lifting device 13 for inspection and maintenance.

In addition, optionally, the blades 21 can be made of carbon fiber, glass fiber or a combination of carbon fiber and glass fiber. Blade 21 roots can be pre-embedded bolts.

Optionally, a video monitoring module is disposed inside the ocean tidal current energy turbine and checks the operation and safety of the ocean tidal current energy turbine.

Optionally, the tidal current energy turbine supporting system and the ocean tidal current energy turbine are configured such that surfaces in contact with seawater are all provided with protective coatings. For example, the protective coatings can be an anticorrosive and antifouling. In addition, anode protection method is adopted.

In the present disclosure, when the ocean tidal current energy power generating system is operating normally, ocean current pushes the blades 21 and the hub 22 to rotate. The blades capture seawater kinetic energy and drive the main shaft 23, the gear box 24, the coupling 25 and the power generator 26 to rotate and convert the seawater kinetic energy into electric energy. The electric energy is transmitted by the submarine cable 7 connected to the power generator 26 to the converter 8 through the submarine cable protection pipe 28 and is integrated into a power grid system through the converter 8. The ocean tidal current energy power generating system can produce 690 V alternating current, which is connected to a booster station via the converter 8 and connected to the grid for power generation.

When the seawater depth is large, for example, when the ocean tidal current energy turbine works at a depth of below 15 meters, instead of adopting the submarine cable protection pipes, an underwater plug connector or a seal connection of submarine cable passing through cabin can be used, which can not only play a sealing role but also reduces the force applied on the submarine cable protection pipes and reduces the influence of ocean current fluctuation.

The above is only a preferred embodiment of the present disclosure and does not provide any formal restriction on the present disclosure. Simple modifications, equivalent changes or embellishments made by those skilled in the art using the technical content disclosed above, fall within the protection scope of the present disclosure.

INDUSTRIAL APPLICABILITY

The ocean tidal current energy power generating system adopted in the present disclosure can safely and reliably generate electricity by utilizing ocean tidal current energy. The direction of the ocean current can be monitored in real time. The yawing direction and the variable pitch direction are adjusted in real time according to the current direction, so as to ensure the highly efficient conversion of the ocean tidal current energy into electric energy and to reduce the loss of power connected to the grid.

What is claimed is:

1. An ocean tidal current energy power generating system, comprising a fixing mechanism, an ocean tidal current energy power generator set and a signal monitoring mechanism; wherein the fixing mechanism comprises floating bodies, fixing rods, horizontal supporting rods, and a working platform; the floating bodies float on sea surface and lower parts of the floating bodies are fixed to seabed by means of anchor chains; the fixing rods are fixed to the floating bodies; the horizontal supporting rods are vertically fixed to underwater portions of the fixing rods, and the working platform is vertically fixed to overwater portions of the fixing rods; the ocean tidal current energy power generator set comprises underwater assemblies and an overwater assembly; each of the underwater assemblies comprises blades, a hub, a main shaft, a gear box, a coupling, a power generator, a stern cabin and a yawing mechanism, and the blades, the hub, the main shaft, the gear box, the coupling, the power generator, the stern cabin and the yawing mechanism are successively connected to one another; a variable pitch mechanism is disposed in the hub; the yawing mechanism is disposed between the coupling of each underwater assembly and a respective horizontal supporting rod, and is configured to drive the underwater assemblies to yaw relatively to the horizontal supporting rod; the underwater assemblies are directly immersed in the seawater; the overwater assembly comprises a converter connected to the power generator by a submarine cable, and a control cabinet connected to the yawing mechanism, the variable pitch mechanism, the gear box, the coupling, the power generator and the stern cabin by submarine cables; the converter and the control cabinet are both disposed on the working platform; the signal monitoring mechanism comprises a current meter connected to the control cabinet; the current meter is disposed on one of the horizontal supporting rods, and is configured to monitor the direction of ocean current in real time.

2. The ocean tidal current energy power generating system of claim 1, wherein the fixing mechanism is a tidal current energy set supporting system; the ocean tidal current energy power generator set is an ocean tidal current energy turbine; the signal monitoring mechanism is a signal monitoring system; each of the floating bodies is a floating structure; the horizontal supporting rods are a horizontal supporting structure; the fixing rods are a fixing structure; the stern cabin is a wiring cabin.

3. The ocean tidal current energy power generating system of claim 2, wherein the ocean tidal current energy power generating system further comprises a lifting mechanism; the lifting mechanism comprises a lifting device and a lifting control system; the lifting device is disposed on the fixing structure, and a lower part of the lifting device is fixedly connected to the horizontal supporting structure; the lifting control system is disposed on the working platform, and is configured to control the lifting device to move up and down along the fixing structure, thereby driving a lifting motion of the underwater assemblies of the ocean tidal current energy turbine.

4. The ocean tidal current energy power generating system of claim 3, wherein the lifting device comprises gears and racks; the racks are fixedly connected to the fixing structure; the gears are fixedly connected to the horizontal supporting structure; and the gears are engaged with the racks.

5. The ocean tidal current energy power generating system of claim 2, wherein the ocean tidal current energy power generating system comprises two underwater assemblies of the ocean tidal current energy turbine; the two underwater assemblies are symmetrically arranged at both ends of the horizontal supporting structure, and the two underwater assemblies are connected to the overwater assembly.

6. The ocean tidal current energy power generating system of claim 2, wherein the yawing mechanism is configured to make the ocean tidal current energy turbine rotate by 180 degrees to maintain a horizontal axis of the ocean tidal current energy turbine parallel to ocean current direction at all times, making the blades and the hub always facing a direction of an incoming flow.

7. The ocean tidal current energy power generating system of claim 2, further comprising an underwater sealing system; wherein the underwater sealing system comprises a second rotary seal disposed between the main shaft and the gear box, a first static seal disposed between the gear box and the coupling, a second static seal disposed between the coupling and the power generator, and a third static seal disposed between the power generator and the wiring cabin.

8. The ocean tidal current energy power generating system of claim 2, wherein the signal monitoring system further comprises a variable pitch sensing assembly, a gear box sensing assembly, a power generator sensing assembly and a wiring cabin sensing assembly, the variable pitch sensing assembly, the gear box sensing assembly, the power generator sensing assembly and the wiring cabin sensing assembly are respectively connected to the control cabinet; the variable pitch sensing assembly is disposed in the hub; the gear box sensing assembly is disposed in the gear box; the power generator sensing assembly is disposed in the power generator; the wiring cabin sensing assembly is disposed in the wiring cabin.

9. The ocean tidal current energy power generating system of claim 8, wherein the variable pitch sensing assembly comprises a variable pitch speed sensor and a variable pitch angle sensor; the variable pitch speed sensor and the variable pitch angle sensor are both disposed in the hub.

10. The ocean tidal current energy power generating system of claim 8, wherein the gear box sensing assembly comprises an oil level sensor, an oil pressure sensor, an oil temperature sensor and a vibration sensor; the oil level sensor is configured to detect oil level in the gear box; the oil pressure sensor is configured to detect oil pressure in the gear box; the oil temperature sensor is configured to detect oil temperature in the gear box; the vibration sensor is configured to detect vibration of transmission components in the gear box.

11. The ocean tidal current energy power generating system of claim 8, wherein the power generator sensing assembly comprises a voltage and current sensor configured to detect voltage and current of the power generator, and a first temperature sensor configured to detect temperature of the power generator.

12. The ocean tidal current energy power generating system of claim 2, wherein the wiring cabin is further provided with submarine cable protection pipes configured to protect the submarine cables; tops of the submarine cable protection pipes are raised above a sea level.

13. The ocean tidal current energy power generating system of claim 2, wherein the tidal current energy set supporting system and the ocean tidal current energy turbine are configured such that surfaces in contact with seawater are all provided with protective coatings.

14. The ocean tidal current energy power generating system of claim 1, wherein the variable pitch mechanism comprises a variable pitch bearing and a variable pitch reducer connected to each other; the variable pitch bearing is fixedly connected to the blades; the control cabinet is connected to the variable pitch reducer, and is configured to send out a control command to the variable pitch reducer to drive the variable pitch bearing to drive the blades.

15. The ocean tidal current energy power generating system of claim 14, further comprising an underwater sealing system; wherein the underwater sealing system comprises a first rotary seal disposed between an inner ring and an outer ring of the variable pitch bearing.

16. The ocean tidal current energy power generating system of claim 1, wherein the variable pitch mechanism is configured to make the blades rotate with a pitch angle from 0 to 270 degrees, wherein a pitch angle is from 0 to 90 degrees with the positive current direction, and a pitch angle is from 180 to 270 degrees with the reverse current direction.

17. The ocean tidal current energy power generating system of claim 1, wherein the yawing mechanism comprises a yawing bearing and a yawing reducer connected to each other; the yawing bearing is fixedly connected to the underwater assemblies; the control cabinet is connected to the yawing reducer, and is configured to send out a control command to the yawing reducer to drive the yawing bearing to drive the underwater assemblies in rotation.

18. The ocean tidal current energy power generating system of claim 1, wherein an isolation flange is disposed between each of the blades and the hub.

19. The ocean tidal current energy power generating system of claim 1, wherein an axial center of each underwater assembly is provided with a hollow shaft; and the hollow shaft is configured for the submarine cable connecting the control cabinet to the variable pitch mechanism to go through.

20. The ocean tidal current energy power generating system of claim 1, wherein the blades are made of carbon fiber, glass fiber or a combination of carbon fiber and glass fiber; wherein blade roots of the blades are pre-embedded bolts.

\* \* \* \* \*